United States Patent Office 3,287,418
Patented Nov. 22, 1966

3,287,418
FLUORINATED ORGANIC ETHERS
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed May 29, 1962, Ser. No. 198,464
6 Claims. (Cl. 260—614)

This invention relates to novel fluorinated nitroethers.

The new fluorinated nitroethers of the invention are monoethers and diethers represented by the general formula:

$$A-R^1-OCF_2CHRNO_2$$

where R is selected from the class consisting of hydrogen, fluorine, perfluoroalkyl and perfluorohydroalkyl radicals and where $R^1$ is an alkylene radical preferably having from 1 to 20 and most desirably 1 to 6 carbon atoms and A is selected from the class consisting of hydrogen and an $-OCF_2CHRNO_2$ radical. As used herein the term perfluoroalkyl means an alkyl radical containing only carbon and fluorine and perfluorohydroalkyl means an alkyl radical containing only carbon, fluorine and hydrogen where the molar ratio of fluorine:hydrogen is at least 1:1.

Preferably R is hydrogen or fluorine. Where R is perfluoroalkyl or a perfluorohydroalkyl radical it may be straight or branched chain and preferably has from 1 to 10 carbon atoms and most desirably from 1 to 6 carbon atoms.

The preferred compounds of the invention are the monoethers which may be represented by the general formula:

$$R''OCF_2CHRNO_2$$

where $R''$ is an alkyl radical preferably having from 1 to about 20 and most desirably from 1 to about 6 carbon atoms and where R is as defined above. Particularly preferred are compounds of the type $ROCF_2CH_2NO_2$ and $ROCF_2CHFNO_2$ which may be prepared from the relatively inexpensive and available olefins vinylidene fluoride and trifluoroethylene.

The compounds of the invention are prepared by the reaction of a mono or dihydroxy alkanol with a fluorinated alkyl nitroiodide of the general formula $$ICF_2CHRNO_2$$

where R is as defined above. As exemplified by a monohydroxy alkanol, the reaction may be represented as follows:

$$ROH + ICF_2CHRNO_2 \rightarrow ROCF_2CHRNO_2 + HI$$

Although the invention is not limited by any particular reaction mechanism, it is believed that the reaction represented above proceeds in two steps; first, through the elimination of HI to form an olefin to which the alcohol then adds in accordance with the following (as exemplified by the production of a monoether):

$$ICF_2CHRNO_2 \xrightarrow{-HI} CF_2=CRNO_2$$

$$CF_2=CRNO_2 + ROH \rightarrow ROCF_2CHRNO_2$$

The precursor fluorinated nitroiodides may be prepared according to the procedures described in copending application Serial No. 196,918, filed May 23, 1962 of Murray Hauptschein and Robert Oesterling entitled, Fluorinated Organic Iodides, now United States Patent 3,118,004, by the addition of $N_2O_4$ to fluorinated olefins of the formula $CF_2=CHR$ in the presence of iodine.

The etherification reaction to produce the compounds of the invention may be carried out at temperatures of from 0 to 200° C., preferably from 20° to 100° C. The reaction is generally carried out most conveniently at atmospheric pressures, although if desired super-atmospheric pressures ranging up to 1000 lbs./in.² may be used. Reaction time is not critical and may range e.g. from 0.5 to 24 hours. The molar ratios of reactants are likewise not critical. Generally an excess of the alkanol is used in order to assure good conversions of the nitroiodide. In most cases, the molar ratio of alkanol to nitroiodide will range from 2:1 to 50:1. Substantially anhydrous reaction conditions are desirable to avoid side reactions.

Typical examples of the fluorinated nitroethers of the invention are shown in the table below which also shows the precursor nitroiodide and alkanol.

Precursor nitroiodide:
    $ICF_2CH_2NO_2$
    $ICF_2CH_2NO_2$
    $ICF_2CH_2NO_2$
    $ICF_2CH_2NO_2$
    $ICF_2CH_2NO_2$
    $ICF_2CH_2NO_2$
    $ICF_2CHFNO_2$
    $ICF_2CH(NO_2)C_3F_7$ Precursor alkanol:
    $CH_3OH$
    $C_2H_5OH$
    $(CH_3)_2CHCH_2OH$
    $(CH_3)_2CHOH$
    $OHCH_2CH_2CH_2OH$
    $HO-(CH_2)_6-OH$
    $C_2H_5OH$
    $C_2H_5OH$ Fluorinated nitroether:
    $CH_3OCF_2CH_2NO_2$
    $C_2H_5OCF_2CH_2NO_2$
    $(CH_3)_2CHCH_2OCF_2CH_2NO_2$
    $(CH_3)_2CHOCF_2CH_2NO_2$
    $NO_2CH_2CF_2OCH_2CH_2CH_2-O-CF_2CH_2NO_2$
    $NO_2CH_2CF_2O(CH_2)_6OCF_2CH_2NO_2$
    $C_2H_5OCF_2CHFNO_2$
    $C_2H_5OCF_2CH(NO_2)C_3F_7$ The fluorinated nitroethers of the invention have good thermal stability and are stable in acid and neutral media. They are useful as solvents or plasticizers particularly as solvents or plasticizers for fluorinated or partially fluorinated organic materials, such as fluorinated organic polymers. The combination of the ether group, the nitro group, together with the fluoro and alkyl groups contained in the molecule, enhances the solvency capabilities of these compounds. The same combination of groups makes these compounds useful additives for rocket propellants.

While stable in acid and neutral media, the ethers of the invention undergo hydrolysis in basic media to nitroesters and/or acids, e.g.

$$C_2H_5OCF_2CH_2NO_2 \longrightarrow$$

$$C_2H_5O\overset{O}{\underset{\|}{C}}CH_2NO_2 \xrightarrow{NaOH} NO_2CH_2COONa$$

The nitroesters are useful as insecticides, fungicides and the like.

The following examples illustrate several specific embodiments of the invention:

*Example 1*

To 28 g. (0.61 mole) of absolute ethanol at room temperature there is slowly added while stirring 23 g. (0.097 mole) of $ICF_2CH_2NO_2$. The temperature rises during the addition to about 40° C. Stirring is continued for an additional 4 hours and the reaction product is then isolated by distilling off all volatile components boiling lower than 50° C. at 0.1 mm. Hg and then treating the distillate with water. The water insoluble layers are dried and redistilled to obtain 9.5 g. of the fluorinated nitroether $CH_3CH_2OCF_2CH_2NO_2$ having a boiling point of 61° C. at 20 mm. Hg.

*Analysis.*—Calculated for $C_4H_7O_3F_2N$: C, 30.97; H, 4.55; N, 9.03. Found: C, 30.40; H, 4.28; N, 8.93

The infrared spectrum of $C_2H_5OCF_2CH_2NO_2$ (liquid) displays the following absorption bands (in microns): 3.27 (medium), 3.35 (medium strong), 3.42 (medium), 6.36 (very, very strong), 7.04 (strong), 7.26 (very strong), 7.40 (very strong), 7.81 (very strong), 8.07 (very strong), 8.35 (strong), 8.72 (strong shoulder), 9.16 (strong), 9.38 (strong), 9.67 (very strong), 10.37 (medium), 10.97 (medium strong), 11.30 (strong), 12.07 (medium strong), 13.04 (medium strong), 14.47 (strong).

The peak at $6.36\mu$ corresponds to the asymmetric $NO_2$ stretching vibration in compounds containing the $$—CH_2NO_2$$

group.

*Example 2.—Preparation of $CH_3OCF_2CH_2NO_2$*

10.3 of $ICF_2CH_2NO_2$ is refluxed with 50 cc. of methanol for 4 hours after which the excess methanol, as well as some methyl iodide and HI formed in the reaction, are distilled off at atmospheric pressure. The residue is dissolved in methylene chloride, washed with aqueous sodium bisulfite to remove iodine, dried over anhydrous magnesium sulfate and distilled. The pure ether $CH_3OCF_2CH_2NO_2$ boiling at 57° C. at 22 mm. Hg, is obtained in 95% yield.

*Analysis.*—Calculated for $C_3H_5F_2NO_3$: C, 25.54; H, 3.57; F, 26.93; N, 9.93. Found: C, 25.51; H, 3.41; F, 26.44; N, 9.84.

The infrared spectrum of $CH_3OCF_2CH_2NO_2$ (liquid) displays the following absorption bands (in microns): 3.22 (medium), 3.32 (medium strong), 3.46 (medium), 6.38 (very, very strong), 6.89 (strong), 7.03 (strong), 7.22 (strong), 7.40 (very strong), 7.77 (very strong), 8.05 (very strong), 8.73 (strong), 8.90 (strong), 9.33 (strong), 9.71 (strong), 10.00 (strong), 10.97 (very strong), 12.02 (strong), 12.22 (medium strong), 13.00 (strong), 14.46 (strong).

The peak at $6.38\mu$ corresponds to the asymmetric $NO_2$ stretching vibration in compounds containing the $$—CH_2NO_2$$

group.

*Example 3.—Preparation of $CH_3CH_2OCF_2CHFNO_2$*

One-tenth of a mole of $ICF_2CHFNO_2$ is refluxed with 40 cc. of absolute ethanol for 5 hours after which the excess ethanol and other by-products are removed and the residue is washed with water and aqueous sodium bisulfite, dried over anhydrous magnesium sulfate and distilled. The ether $CH_3CH_2OCF_2CHFNO_2$ is obtained.

*Example 4.—Preparation of*

$$CH_3CH_2OCF_2CH(C_3F_7)NO_2$$

Following the procedure of the previous examples, the nitroiodide $ICF_2CH(C_3F_7)NO_2$ is refluxed with an excess of absolute ethanol. The ether $$CH_3CH_2OCF_2CH(C_3F_7)NO_2$$

is recovered by distillation.

*Example 5.—Preparation of*

$$(CH_3)_2CHCH_2OCF_2CH_2NO_2$$

Following the procedure of the previous examples, the iodide $ICF_2CH_2NO_2$ is heated with an excess of isobutyl alcohol at a temperature of 100° C. for 5 hours. The ether $(CH_3)_2CHCH_2OCF_2CH_2NO_2$ is recovered by distillation.

*Example 6.—Preparation of*

$$NO_2CH_2CF_2O(CH_2)_6OCF_2CH_2NO_2$$

Following the procedures of the previous example, the iodide $ICF_2CH_2NO_2$ is heated with an excess of hexamethylene glycol at a temperature of 100° C. for 5 hours. After separation of excess glycol and other by-products, the diether $NO_2CH_2CF_2O(CH_2)_6OCF_2CH_2NO_2$ is obtained.

We claim:
1. A fluorinated nitroether of the general formula:

$$A—R^1—OCF_2CHRNO_2$$

where A is selected from the class consisting of hydrogen and $—OCF_2CHRNO_2$ radicals; where $R^1$ is an alkylene radical having from 1 to 20 carbon atoms, and where R is selected from the class consisting of hydrogen fluorine, perfluoroalkyl radicals and perfluorohydroalkyl radicals having from 1 to 10 carbon atoms.
2. A fluorinated nitroether in accordance with claim 1 in which $R^1$ contains from 1 to 6 carbon atoms.
3. A fluorinated nitroether of the general formula:

$$R''OCF_2CHRNO_2$$

where $R''$ is an alkyl radical containing from about 1 to 20 carbon atoms and where R is selected from the class consisting of hydrogen, fluorine, perfluoroalkyl radicals and perfluorohydroalkyl radicals having from 1 to 10 carbon atoms.
4. The fluorinated nitroether $CH_3CH_2OCF_2CH_2NO_2$.
5. The fluorinated nitroether $CH_3OCF_2CH_2NO_2$.
6. A method for preparing fluorinated nitroethers which comprises the step of reacting at a temperature of from 0° C. to 200° C. an alcohol selected from the class consisting of monohydroxy and dihydroxy alkanols having from 1 to 20 carbon atoms with a fluorinated alkyl nitroiodide of the formula:

$$ICF_2CHRNO_2$$

where R is selected from the class consisting of hydrogen, fluorine, perfluoroalkyl radicals and perfluorohydroalkyl radicals having from 1 to 10 carbon atoms.

No references cited.

LEON ZITVER, *Primary Examiner.*

B. HELFIN, H. T. MARS, *Assistant Examiners.*